United States Patent
Kojima et al.

(10) Patent No.: US 9,384,166 B2
(45) Date of Patent: Jul. 5, 2016

(54) VEHICULAR INPUT DEVICE AND VEHICULAR INPUT METHOD

(75) Inventors: Yoshihiro Kojima, Hyogo (JP); Nobuyuki Nakano, Aichi (JP); Masaki Tada, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 166 days.

(21) Appl. No.: 13/703,652

(22) PCT Filed: Apr. 19, 2012

(86) PCT No.: PCT/JP2012/002717
§ 371 (c)(1),
(2), (4) Date: Dec. 12, 2012

(87) PCT Pub. No.: WO2012/144217
PCT Pub. Date: Oct. 26, 2012

(65) Prior Publication Data
US 2013/0090807 A1    Apr. 11, 2013

(30) Foreign Application Priority Data
Apr. 22, 2011    (JP) ................. 2011-096631

(51) Int. Cl.
*G01M 17/00*    (2006.01)
*G06F 17/00*    (2006.01)
(Continued)

(52) U.S. Cl.
CPC .............. *G06F 17/00* (2013.01); *B60K 35/00* (2013.01); *B60K 37/06* (2013.01); *G06F 3/041* (2013.01); *B60K 2350/1012* (2013.01); *B60K 2350/925* (2013.01); *B60K 2350/928* (2013.01)

(58) Field of Classification Search
CPC .......... B60K 2350/1012; B60K 37/06; B60K 2350/901; B60K 2350/903; B60K 35/00; B60K 2350/1016; B60K 2350/1052; B60K 2350/928; B60K 28/066; G01C 21/3664; G01S 15/08; G01S 15/87; G01S 15/88

USPC .............................................. 701/29.2
See application file for complete search history.

(56) References Cited

U.S. PATENT DOCUMENTS

| 8,748,856 B2* | 6/2014 | Campbell ......... H01L 27/14618 250/221 |
| 2004/0178924 A1* | 9/2004 | Gifford ............... H03K 17/955 340/870.07 |

(Continued)

FOREIGN PATENT DOCUMENTS

| CN | 101466569 | 6/2009 |
| JP | 2006-300786 | 11/2006 |

(Continued)

OTHER PUBLICATIONS

International Search Report issued Jul. 10, 2012 in International (PCT) Application No. PCT/JP2012/002717.
(Continued)

*Primary Examiner* — Redhwan K Mawari
(74) *Attorney, Agent, or Firm* — Wenderoth, Lind & Ponack, L.L.P.

(57) ABSTRACT

An object of the present invention is to provide a vehicular input device which is capable of improving accuracy for detecting a contactless input from a driver. A vehicular input device includes a contactless operation detecting unit for detecting a contactless operation on a center display, distance detecting units, distance information storing units in which distance information items obtained from the distance detecting units are stored for each of the distance detecting units, a proximity object determining unit for determining whether or not an object is in proximity of any of predetermined specific positions in a vehicle based on the stored distance information items, and a detecting operation controlling unit for limiting the detection by the contactless operation detecting unit when the object is determined to be in the proximity of any of the specific positions.

5 Claims, 8 Drawing Sheets

(51) Int. Cl.
*B60K 37/06* (2006.01)
*G06F 3/041* (2006.01)
*B60K 35/00* (2006.01)

(56) References Cited

U.S. PATENT DOCUMENTS

| | | | | |
|---|---|---|---|---|
| 2004/0233153 | A1* | 11/2004 | Robinson | G09G 3/3406 345/102 |
| 2005/0248529 | A1* | 11/2005 | Endoh | G06F 3/0304 345/156 |
| 2007/0244613 | A1* | 10/2007 | Ishikawa | B60K 37/06 701/29.2 |
| 2008/0053233 | A1* | 3/2008 | Sugiura | B60K 35/00 73/628 |
| 2008/0130953 | A1 | 6/2008 | Ishikawa | |
| 2009/0058830 | A1* | 3/2009 | Herz | G06F 3/044 345/173 |
| 2009/0066474 | A1 | 3/2009 | Kawachi et al. | |
| 2009/0231145 | A1* | 9/2009 | Wada | A61B 5/02416 340/575 |
| 2010/0238280 | A1* | 9/2010 | Ishii | B60K 35/00 348/77 |
| 2011/0148612 | A1* | 6/2011 | Nakazono | G01S 15/931 340/435 |
| 2011/0164060 | A1* | 7/2011 | Miyazawa | G06F 1/1643 345/660 |
| 2011/0205164 | A1* | 8/2011 | Hansen | B60K 37/06 345/173 |
| 2013/0076499 | A1* | 3/2013 | Okita | B60K 35/00 340/438 |
| 2013/0090807 | A1* | 4/2013 | Kojima | B60K 37/06 701/36 |

FOREIGN PATENT DOCUMENTS

| | | |
|---|---|---|
| JP | 2007-302215 | 11/2007 |
| JP | 2007-302223 | 11/2007 |
| JP | 2008-310643 | 12/2008 |
| JP | 2009-248629 | 10/2009 |
| JP | 2010-254199 | 11/2010 |

OTHER PUBLICATIONS

European Search Report issued Jul. 29, 2014 issued for the corresponding European patent application No. 12 774 292.2.
Office Action and Search Report issued May 5, 2015 in corresponding Chinese Application No. 201280001817.X, with partial English translation.

* cited by examiner

VEHICULAR INPUT DEVICE AND VEHICULAR INPUT METHOD

TECHNICAL FIELD

The present invention relates to vehicular input devices including displays and vehicular input methods, and particularly to a vehicular input device which is operated through a screen on a display using a contactless operation detection sensor, and a vehicular input method.

BACKGROUND ART

On screens of central displays having touch sensors installed in automobiles (hereinafter referred to as "vehicles"), maps for navigation systems or television screens are shown along with operation GUIs including menus and control buttons. However, when users including drivers do not perform operations on the operation screens, the operation GUIs showing necessary information are hidden. In other words, the operation GUIs need not be shown in such a case.

In this regard, a technique has been proposed that a proximity sensor for detecting that an object is in the proximity of the display is disposed in the periphery of a display so that an operation GUI such as a menu is shown on the screen only when a hand of a driver is in the proximity of the display.

However, when the detection sensitivity of the proximity sensor is increased or the sensor is disposed between the driver's seat and the display for the purpose of quickly detecting the movement of the driver for operation that is performed in the proximity of the display, the proximity sensor may erroneously detect a normal movement of the driver for driving a vehicle (hereinafter referred to as "driving operation"). There is a problem that such a false detection by the proximity sensor causes an operation feedback (for example, a menu is displayed) which is not intended by the driver.

In order to solve such a problem, a technique has been disclosed that estimates whether the movement of the driver is for a driving operation or for an input operation on the screen based on traveling information of the vehicle obtained from a navigation system, and controls an operation of the proximity sensor according to the result of the estimation (refer to Patent Literature (PTL) 1).

CITATION LIST

Patent Literature

[PTL 1] Japanese Unexamined Patent Application Publication No. 2006-300786

SUMMARY OF INVENTION

Technical Problem

However, the technique in PTL 1 cannot prevent a false detection in which the movement of the driver is erroneously detected as an input operation on the screen which is not intended by the driver.

The present invention was conceived in view of the aforementioned problem and has an object to provide a vehicular input device which is capable of preventing the false detection in which the movement of the driver is erroneously detected as an input operation on the screen which is not intended by the driver.

Solution to Problem

In order to achieve the aforementioned object, the vehicular input device according to an aspect of the present invention is a vehicular input device for receiving an input to an in-vehicle display from a driver, the device includes: a contactless operation detecting unit configured to detect a contactless operation on the in-vehicle display; at least one distance detecting unit configured to detect a distance to an object present in a vehicle; a distance information storage unit in which distance information obtained from the at least one distance detecting unit is stored for each of the at least one distance detecting unit for a predetermined period of time; a proximity object determining unit configured to determine whether or not the object is in the proximity of any of at least one predetermined specific position in the vehicle based on the distance information stored in the distance information storage unit; and a detecting operation controlling unit configured to limit the detection by the contactless operation detecting unit when the proximity object determining unit determines that the object is in the proximity of any of the at least one specific position.

It is to be noted that these general or specific aspects may be implemented not only as such a vehicular input device, but also as an input method having steps corresponding to operations performed by characteristic processing units in the vehicular input device.

Advantageous Effects of Invention

The vehicular input device according to the present invention is capable of decreasing false detections caused by an operation such as a driving operation which is an operation other than a contactless input operation.

DESCRIPTION OF EMBODIMENTS (Knowledge Which Forms the Basis of the Present Invention)

The inventor has found that the following problem arises with respect to the vehicular input device described in the "Background Art" section.

The technique in PTL 1 estimates whether the movement of the driver is for a driving operation or for an input operation on the screen based on the traveling information of the vehicle obtained from the navigation system, and controls the operations of the proximity sensor according to the result of the estimation. By controlling the proximity sensor as above, the technique in PTL 1 prevents the proximity sensor from erroneously detecting a movement of the driver for changing traveling directions of the vehicle.

However, the technique in PTL 1 estimates, based on the traveling information of the vehicle, only driving operations for turning left or right, turning around, or the like which can be erroneously detected by the proximity sensor, and controls the detection by the proximity sensor. As a result, when the vehicle is temporarily stopped or is running on a straight road, the technique in PTL 1 cannot prevent the proximity sensor from erroneously detecting the movement of the driver as an input operation on the screen which is not intended by the driver. Moreover, the traveling information of the vehicle obtained from the navigation system is required for estimating that the movement of the driver is a driving operation. Therefore, it is impossible to prevent the false detection in a vehicle which does not have a navigation system therein.

In order to solve the aforementioned problems, the vehicular input device according to an aspect of the present invention is a vehicular input device for receiving an input to an in-vehicle display from a driver, the device includes: a contactless operation detecting unit configured to detect a contactless operation on the in-vehicle display; at least one distance detecting unit configured to detect a distance to an object present in a vehicle; a distance information storage unit in which distance information obtained from the at least one distance detecting unit is stored for each of the at least one distance detecting unit for a predetermined period of time; a proximity object determining unit configured to determine whether or not the object is in the proximity of any of at least one predetermined specific position in the vehicle based on the distance information stored in the distance information storage unit; and a detecting operation controlling unit configured to limit the detection by the contactless operation detecting unit when the proximity object determining unit determines that the object is in the proximity of any of the at least one specific position.

Accordingly, the proximity object determining unit determines whether or not the object is in the proximity of the specific position such as a position of an operation device for a driving operation based on the distance information obtained from the distance sensor disposed in the vehicle. When it is determined that the object is in the proximity of the specific position, it is judged that a user in the vehicle such as the driver is not performing a contactless input operation, and the detection by the contactless operation detecting unit for detecting a contactless input to the in-vehicle display is limited. With this, it is possible to decrease false detections by the contactless operation detecting unit caused by an operation such as a driving operation which is an operation other than the contactless input operation. Thus, it is possible to reduce a frequency that an operation GUI is shown on the display screen due to a false detection of the movement of the driver not intended to perform the contactless input operation, thereby reducing stress and discomfort given to the driver.

Moreover, the at least one distance detecting unit may be disposed in the vehicle to detect that at least a part of the body of the driver is in the proximity of at least one operation device for driving the vehicle, and the at least one specific position may be a position of the at least one operation device. Moreover, the at least one operation device may be for operating at least one of a steering wheel, a gearshift lever, a windshield wiper switch, and a direction indicator switch. Moreover, the at least one distance detecting unit may be disposed around a position where the driver frequently places a hand when driving, and the at least one specific position is the position where the driver frequently places the hand when driving.

With this, the vehicular input device is capable of accurately determining that the driver is performing the driving operation, thereby reducing false detections in which the driving operation of the driver is erroneously detected as an input operation on the screen.

Moreover, the proximity object determining unit may include: at least one proximity object detecting unit configured to compare the distance information obtained from the distance information storage unit and a preset threshold value, and output proximity detection information when the distance information has a value less than or equal to the threshold value; and a proximity time determining unit configured to determine that the object is in the proximity of any of the at least one specific position when the proximity detection information is outputted from any of the at least one proximity object detecting unit for a preset period of time.

Accordingly, the proximity object determining unit detects, using the proximity object detecting unit, whether or not the object is in the proximity of any of the at least one specific position with the distance between the object and the specific position being less than or equal to the threshold value. Moreover, the proximity time determining unit determines whether or not the period of time in which the object is in the proximity of any of the at least one specific position with the distance between the object and the specific position being less than or equal to the threshold value extends for the preset period of time, so that the proximity object determining unit determines that the object is in the proximity of the at least one specific position. That is, the proximity object determining unit determines that the object is in the proximity of the specific position when the object is in the proximity of the specific position with the distance between the object and the specific position being less than or equal to the threshold value and the state of the object continues for the preset period of time. Therefore, even when the object is in the proximity of the specific position, in the case where, for example, the object is in the proximity of the specific position for less than one second, it is assumed that the driver is not performing a driving operation and thus it is determined that the object is not in the proximity of the specific position, thereby preventing the proximity object detecting unit from making a false detection.

Moreover, the detecting operation controlling unit may be configured to limit at least any one of sensitivity, a detection range, and sampling time of the contactless operation detecting unit.

Accordingly, the detection operation controlling unit limits at least any one of the sensitivity, the detection range, and the sampling time of the contactless operation detection sensor, so that it is possible to accurately prevent the contactless operation detection sensor from erroneously detecting that the driver is performing an operation on the in-vehicle display.

Moreover, each of the contactless operation detecting unit and the distance detecting unit may be one of a proximity sensor, an illuminance sensor, and a pyroelectric sensor. Moreover, the contactless operation detecting unit may be configured to detect, as the contactless operation, the hand of the driver for operation in the proximity of the in-vehicle display, or a hand gesture of the driver such as waving the hand, swinging the hand, and pointing toward the in-vehicle display.

With this, the vehicular input device is capable of accurately determining that the driver is performing the driving operation, thereby reducing false detections in which the driving operation of the driver is erroneously detected as an input operation on the in-vehicle display.

Moreover, the vehicular input device may further include: a contact detecting unit disposed on at least one operation device and configured to detect that the object is in contact with the at least one operation device, the at least one operation device being used for driving the vehicle; a contacting information storage unit in which contacting information obtained from the contact detecting unit is stored for a predetermined period of time; and a contacting object determining unit configured to determine, based on the contacting information stored in the contacting information storage unit, whether or not the object is in contact with any of at least one predetermined specific position in the vehicle, in which the detecting operation controlling unit may be configured to limit the detection by the contactless operation detecting unit when the proximity object determining unit determines that the object is in the proximity of any of the at least one operation device, or when the contacting object determining unit determines that the object is in contact with any of the at least one operation device.

Accordingly, the contacting object determining unit determines whether or not the object is in contact with the at least one specific position such as a position of the operation device for the driving operation based on the contacting information obtained from the contact detecting unit disposed in the vehicle. When it is determined that the object is in contact with the specific position, it is judged that the driver is not performing a contactless input operation, and the detection by the contactless operation detecting unit for detecting a contactless input to the in-vehicle display is limited. With this, it is possible to decrease false detections by the contactless operation detecting unit, for example, caused by an operation such as a driving operation which is an operation other than a contactless input operation. Thus, it is possible to reduce the frequency that an operation GUI is shown on the display screen due to the false detection of the movement of the driver not intended to perform a contactless input to the in-vehicle display, thereby reducing stress and discomfort given to the driver. Furthermore, by detecting whether or not the movement is intended to perform a contactless input using not only the state in which an object including the driver's hand is in the proximity of the specific position of the operation device, but the state in which the object is in contact with the specific position, it is possible to better prevent false detections compared to the case of using only that the object is in the proximity of the specific position.

Moreover, the contacting object determining unit may include: a contacting object detecting unit configured to output contact detection information based on the contacting information obtained from the contacting information storage unit; and a contacting time determining unit configured to determine that the object is in contact with any of the at least one operation device when the contact detection information is outputted from the contacting object detecting unit for the preset period of time. Moreover, the contact detecting unit may be either a capacitance touch sensor or a resistive touch sensor.

Accordingly, the contacting object determining unit determines whether or not the object is in contact with any of the specific positions using the contacting object detecting unit.

Moreover, the contacting object determining unit determines whether or not the period of time in which the object is in contact with the specific position extends for the preset period of time using the contacting time determining unit. That is, the contacting object determining unit determines that the object is in contact with the specific position when the object contacts with the specific position and the state of the object continues for the preset period of time. Therefore, even when the object is in contact with the specific position, in the case where, for example, the object is in contact with the specific position for less than one second, it is assumed that the driver is not performing the driving operation and thus it is determined that the object is not in contact with the specific position, thereby preventing the contacting object detecting unit from making a false detection.

It is to be noted that these general or specific aspects may be implemented not only as such a vehicular input device, but also as a vehicular input method having the steps corresponding to the operations performed by the characteristic processing units in the vehicular input device.

The following describes a vehicular input device according to an aspect of the present invention.

It should be noted that the embodiments described below are each merely an illustrative embodiment of the present invention. Constituent elements, steps, the order of steps, and so on described in the following embodiments are merely examples, and are not intended to limit the present invention. Moreover, among the constituent elements in the following embodiments, constituent elements not recited in any one of the independent claims defining the most generic part of the inventive concept are described as optional constituent elements.

[Embodiment 1]

Figure 1:
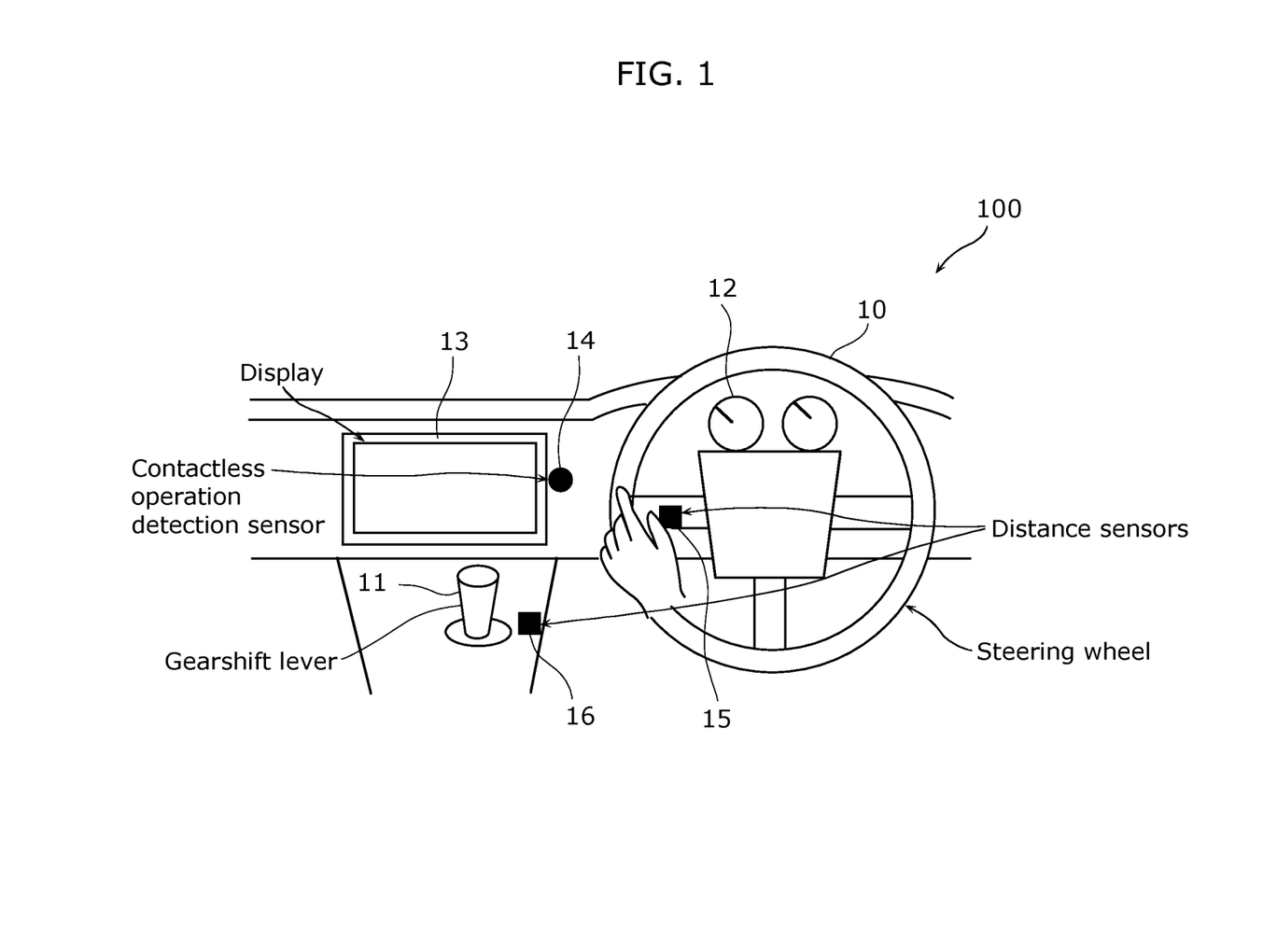
FIG. 1 is an overview diagram showing a position, in a vehicle, of a vehicular input device according to Embodiment 1 of the present invention.

FIG. 1 is an overview diagram showing a position, in a vehicle, of a vehicular input device according to Embodiment 1 of the present invention.

As shown in FIG. 1, the vehicle includes a steering wheel 10, a gearshift lever 11, a meter 12, a center display 13, a contactless operation detection sensor 14, plural distance sensors 15 and 16 provided therein.

The steering wheel 10 is an operation device for a driving operation, for turning wheels to change the traveling direction of a vehicle. The wheels turn right with respect to the traveling direction of the vehicle when a driver turns the steering wheel 10 to the right, and the wheels turn left with respect to the traveling direction of the vehicle when a driver turns the steering wheel 10 to the left.

The gearshift lever 11 is an operation device for changing gear ratio in a transmission in the case where the vehicle is a manual transmission (MT) vehicle. The gearshift lever 11 is an operation device for changing shift modes of gear ratio in a transmission in the case where the vehicle is an automatic transmission (AT) vehicle.

The meter 12 is a device for indicating the number of revolutions of an engine, velocity of the vehicle, and others.

The center display 13 is a display device for showing, for example, maps for a navigation system and television screens, and is an in-vehicle display, for example. Moreover, the center display 13 includes a touch panel which receives an input from a user. The user directly touches an operation GUI shown on the display screen for inputting operations on the navigation system, the television screens, and others.

The contactless operation detection sensor 14 is a sensor for receiving an input, which is inputted in response to the operation GUI shown on the center display 13, from the driver by detecting the movement of the driver's hand and the like. The contactless operation detection sensor 14 is a proximity sensor in Embodiment 1. It is to be noted that the contactless operation detection sensor 14 is not limited to the proximity sensor, but may be either an illuminance sensor or a pyroelectric sensor, or may be a combination of at least two of the proximity sensor, the illuminance sensor and the pyroelectric sensor. For example, when the driver's hand is in the proximity of the center display 13, the contactless operation detection sensor 14 detects the movement of the driver's hand at that time and shows the operation GUI including menus and control buttons. Accordingly, the driver can operate the navigation system, the television screen, and others by moving his/her hand according to the operation GUI shown on the center display 13.

The distance sensors 15 and 16 are sensors for detecting the distance to an object present in the vehicle, and mainly for detecting that at least a part of the driver's body (for example, a hand) is in the proximity of the sensors. The distance sensors 15 and 16 are proximity sensors in Embodiment 1. It is to be noted that the distance sensors 15 and 16 are each not limited to the proximity sensor, but may be either the illuminance sensor or the pyroelectric sensor, or may be a combination of at least two of the proximity sensor, the illuminance sensor and the pyroelectric sensor. The distance sensor 15 is positioned on the steering wheel 10 as shown in FIG. 1, and detects whether or not an object is present near the steering wheel 10. Based on the result of the detection, it is determined whether or not the driver is in a state of operating the steering wheel 10. Moreover, the distance sensor 16 is positioned at a base part of the gearshift lever 11, and detects whether or not an object is present near the gearshift lever 11. Based on the result of the detection by the distance sensor 16, it is determined whether or not the driver is in a state of operating the gearshift lever 11. Moreover, although not shown, the distance sensors may be disposed around positions where the driver frequently places his/her hand when driving and which are different from the above positions where the distance sensors 15 and 16 are disposed. With this, even at a position which can be erroneously detected by the contactless operation detection sensor 14 easily and which is irrelevant to the operation devices, the distance sensor can detect the movement of the driver's hand and the like.

Figure 2:
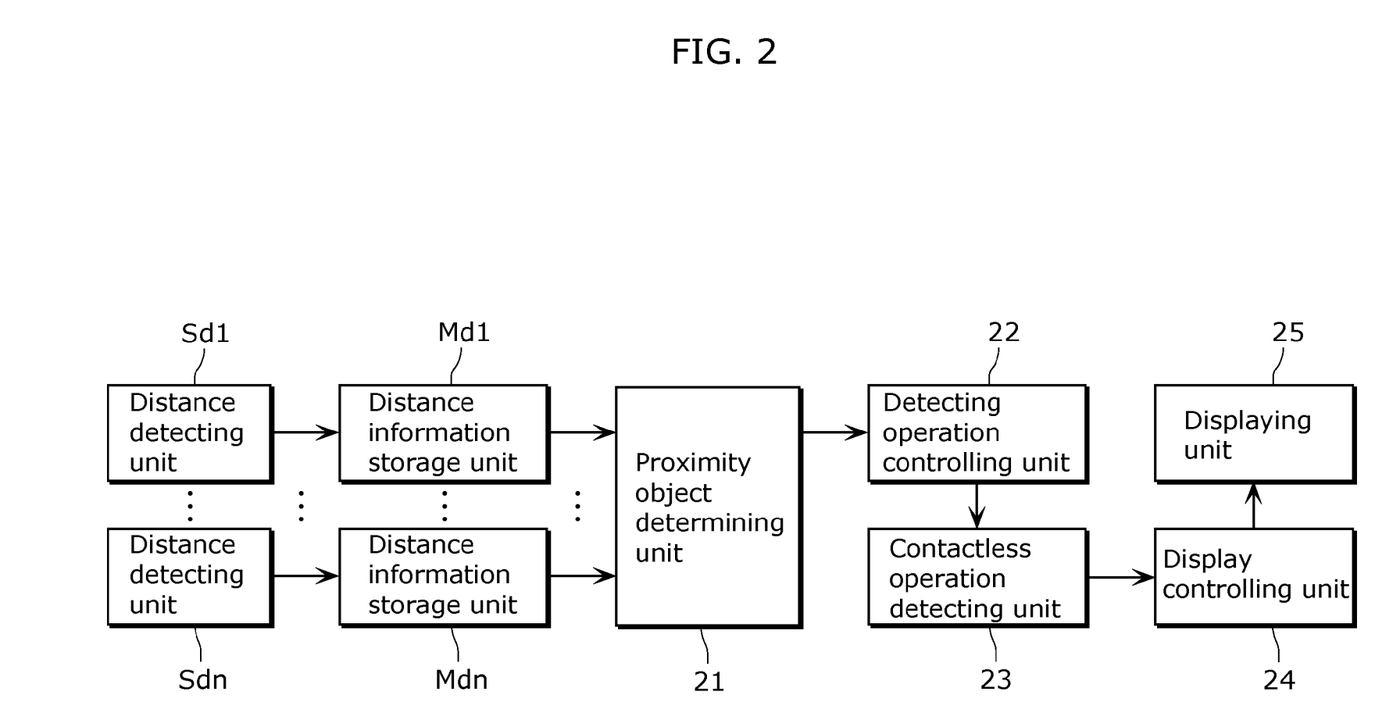
FIG. 2 is a block diagram showing a configuration of the vehicular input device according to Embodiment 1 of the present invention.

FIG. 2 is a block diagram showing a configuration of the vehicular input device 100 according to Embodiment 1 of the present invention.

As shown in FIG. 2, the vehicular input device 100 includes, in terms of the function, plural distance detecting units Sd1, Sd2, to Sdn, plural distance information storage units Md1, Md2, to Mdn, a proximity object determining unit 21, a detecting operation controlling unit 22, a contactless operation detecting unit 23, a display controlling unit 24, and a displaying unit 25.

The distance detecting units Sd1, Sd2, to Sdn (n=2 in this embodiment) are implemented as the distance sensors 15 and 16 shown in FIG. 1. The distance detecting units Sd1, Sd2, to Sdn are disposed in the vehicle to detect that at least a part of the driver's body (for example, the driver's hand) is in the proximity of the operation devices including the steering wheel 10 and the gearshift lever 11 which are for driving the vehicle. It is to be noted that the number of distance detecting units is not limited to more than two, but may be one in this embodiment.

The distance information storage units Md1, Md2, to Mdn (n=2 in this embodiment) are provided corresponding to the distance detecting units Sd1, Sd2, to Sdn, respectively, and distance information obtained from each of the distance detecting units Sd1, Sd2, to Sdn is stored therein for each of the distance detecting units Sd1, Sd2, to Sdn for a predetermined period of time. In other words, a distance information storage unit Mdi (i is an arbitrary number) is provided corresponding to a distance detecting unit Sdi, and distance information obtained from the distance detecting unit Sdi is stored therein. It is to be noted that the distance information is information for indicating the distance to the object from the distance sensors 15 and 16 which constitute the distance detecting units Sd1, Sd2, to Sdn. For example, given that the distance according to the distance information detected by the distance detecting unit Sd1 is 30 cm, the distance from the distance sensor 15 which constitutes the distance detecting unit Sd1 is 30 cm. It is to be noted that the number of distance information storage units is not limited to more than two, but may be one. Even in such a case, in the distance information storage unit, items of the distance information detected by the plural distance sensors are stored for each of the distance sensors.

The proximity object determining unit 21 determines whether or not the object is in the proximity of any of predetermined plural specific positions in the vehicle based on the plural distance information items stored in the distance information storage units Md1, Md2, to Mdn. It is to be noted that the specific positions in the vehicle are the positions of the steering wheel 10 and the gearshift lever 11 which are the operation devices, and the positions where the driver frequently places his/her hand when driving (for example, the surface of a driver backrest, behind the gearshift lever 11, and a periphery of the part behind the gearshift lever 11). It is to be noted that the number of distance information items is not limited to more than two, but may be one. Moreover, the number of specific positions is not limited to more than two, but may be one. That is, the number of objects detected by the distance detecting units Sd1, Sd2, to Sdn may be one.

Figure 3:
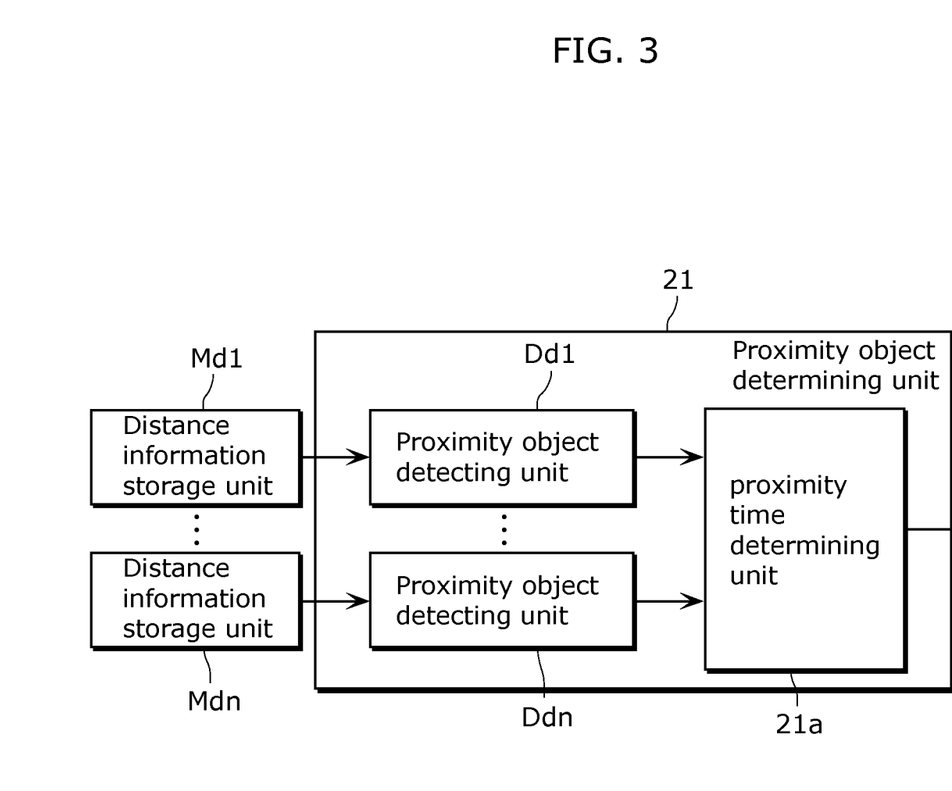
FIG. 3 is a block diagram showing a configuration of a proximity object determining unit according to Embodiment 1 of the present invention.

The proximity object determining unit 21 also includes plural proximity object detecting units Dd1, Dd2, to Ddn, and a proximity time determining unit 21a as shown in FIG. 3. FIG. 3 is a block diagram showing a configuration of a proximity object determining unit 21 according to Embodiment 1 of the present invention. The proximity object detecting units Dd1, Dd2, to Ddn are provided corresponding to the distance information storage units Md1, Md2, to Mdn, respectively, compare the distance information obtained from the distance information storage units Md1, Md2, to Mdn and a preset threshold value, and output proximity detection information when the distance information has a value less than or equal to the threshold value.

The proximity time determining unit 21a determines that the object is in the proximity of any of the specific positions when the proximity detection information is outputted from any of the proximity object detecting units Dd1, Dd2, to Ddn for the preset period of time. As described above, the proximity object determining unit 21 determines whether or not the object (such as the driver's hand) is in the proximity of the steering wheel 10 or the gearshift lever 11 based on the distance information items stored in the distance information storage units Md1, Md2, to Mdn.

For example, a description is given assuming that the threshold value is the value of distance information corresponding to a distance of 15 cm and the preset period of time is for 5 seconds. When the distance to the object from the distance sensor that constitutes the distance detecting unit Sdi which has outputted the distance information is less than or equal to 15 cm, the proximity object detecting unit Ddi outputs the proximity detection information. Furthermore, the proximity time determining unit 21a determines that the object is in the proximity of the specific position when the proximity detection information is continuously outputted from the proximity object detecting unit Ddi for the preset period of time that is for 5 seconds. That is, the proximity object determining unit 21 determines that the driver is performing the driving operation when the period of time in which the distance from the distance sensor is less than or equal to 15 cm extends for 5 seconds.

When the proximity object determining unit 21 determines that the object is in the proximity of any of the specific positions, the detecting operation controlling unit 22 limits the detection by the contactless operation detecting unit 23. The detecting operation controlling unit 22 limits the detection by the contactless operation detecting unit 23 by changing the sensitivity of the contactless operation detecting unit 23.

The contactless operation detecting unit 23 is implemented as the contactless operation detection sensor 14 in FIG. 1. The contactless operation detecting unit 23 receives an input of a contactless operation on the center display 13 that is the in-vehicle display. The contactless operation detecting unit detects, as the contactless operation, a hand gesture of the driver such as waving hands, swinging hands, and pointing toward the center display 13.

The display controlling unit 24 causes the displaying unit 25 to display the result of the input and others that are inputted through the contactless operation by the driver which is obtained from the contactless operation detecting unit 23.

The displaying unit 25 is implemented as the center display 13 in FIG. 1. The displaying unit 25 displays the result of the input and others from the contactless operation detection sensor 14 via the display controlling unit 24.

Next, the following describes a procedure of operation input processing performed by the above described vehicular input device 100 according to the Embodiment 1 configured as above.

Figure 4:
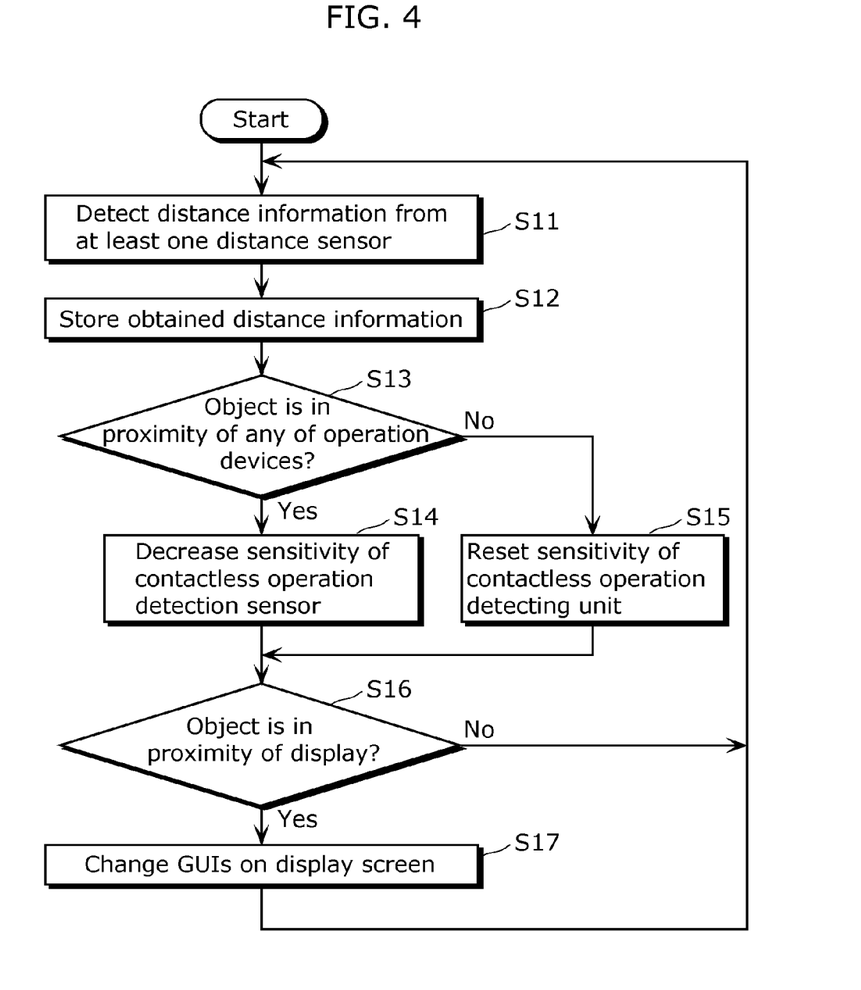
FIG. 4 is a flowchart showing a procedure of operation input processing performed by the vehicular input device according to Embodiment 1 of the present invention.

FIG. 4 is a flowchart showing the procedure of the operation input processing performed by the vehicular input device according to Embodiment 1.

First, in the operation input processing, the distance detecting units Sd1, Sd2, to Sdn detect that the object is in the proximity of any of the distance sensors 15 and 16 (at least one distance sensor) and output the result as the distance information (S11).

Next, in the distance information storage units Md1, Md2, to Mdn corresponding to the respective distance detecting units Sd1, Sd2, to Sdn, the distance information provided from a corresponding distance sensor is stored (S12).

Subsequently, the proximity object determining unit 21 determines whether or not the object is in the proximity of the steering wheel 10 or the gearshift lever 11 based on items of the distance information stored in the distance information storage units Md1, Md2, to Mdn (S13).

When the proximity object determining unit 21 determines that the object is in the proximity of the steering wheel 10 or the gearshift lever 11, the detecting operation controlling unit 22 limits the detection by the contactless operation detecting unit 23 (S14), and the process proceeds to the next Step S16.

On the other hand, when the proximity object determining unit 21 determines that the object is not in the proximity of the steering wheel 10 or the gearshift lever 11, the sensitivity of the contactless operation detecting unit 23 is reset to the initial state (S15), and the process proceeds to the next Step S16.

Subsequently, the contactless operation detecting unit 23 determines whether or not the object is in the proximity of the display (S16).

When the contactless operation detecting unit 23 determines that the object is in the proximity of the center display 13, the GUI in the screen shown on the center display 13 is changed based on the input that is inputted through the movement of the object (S17).

When the contactless operation detecting unit 23 determines that the object is not in the proximity of the center display 13, the process returns to Step S11.

Accordingly, when it is determined that the object is in the proximity of any of the operation devices in Step S13 (hereinafter referred to as "proximity state"), it is determined that the driver is performing the driving operation. That is, the vehicular input device 100 determines that the driver is not performing a contactless input to the center display 13. In Step S14, the detecting operation controlling unit 22 decreases, based on the determination, the sensitivity of the contactless operation detecting unit 23 which is for detecting a contactless input to the center display 13. With this, it is possible to prevent the contactless operation detecting unit 23 from erroneously detecting the driving operation of the driver (for example, a movement to operate the steering wheel 10). On the other hand, when it is determined that the object is not in the proximity of any of the operation devices in Step S13, it is determined that the driver is not performing the driving operation. In this case, when the object is in the proximity of the center display 13, the contactless operation detection sensor 14 is capable of accurately receiving an input from the object (the driver's hand) because the sensitivity is not limited. Thus, it is possible to reduce the frequency that an operation GUI such as a menu is shown on the display screen due to the false detection of the movement of the driver not intended to perform a contactless input, thereby reducing stress and discomfort given to the driver.

Moreover, in the vehicular input device 100 according to Embodiment 1, the proximity object determining unit 21 detects, using the proximity object detecting units Dd1, Dd2, to Ddn, whether or not the object is in the proximity of any of the specific positions (the plural operation devices) with the distance between the object and the specific position being less than or equal to the threshold value. Moreover, the proximity time determining unit determines that whether or not the period of time in which the object is in the proximity of the specific position with the distance between the object and the specific position being less than or equal to the threshold value extends for the preset period of time, so that the proximity object determining unit 21 determines that the object is in the proximity of the specific position. That is, the proximity object determining unit 21 determines that the object is in the proximity of the specific position when the object is in the proximity of the specific position with the distance between the object and the specific position being less than or equal to the threshold value and the state of the object continues for the preset period of time. Therefore, even when the object is in the proximity of the specific position, in the case where, for example, the object is in the proximity of the specific position for less than one second, it is assumed that the driver is not performing the driving operation and thus it is determined that the object is not in the proximity of the specific position, thereby preventing the false detection.

[Embodiment 2]

Figure 5:
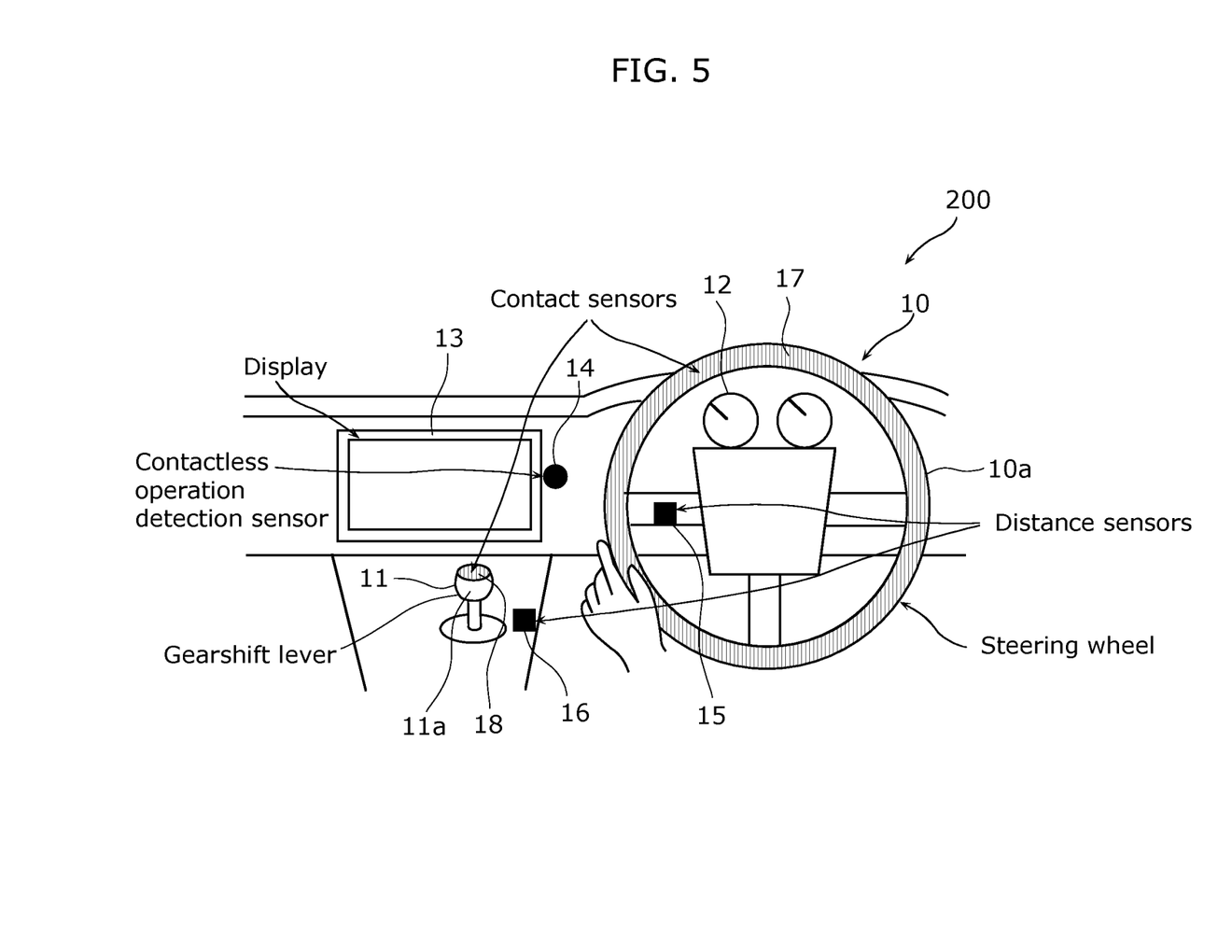
FIG. 5 is an overview diagram showing a position, in a vehicle, of a vehicular input device according to Embodiment 2 of the present invention.

FIG. 5 is an overview diagram showing a position, in a vehicle, of a vehicular input device according to Embodiment 2 of the present invention.

A vehicular input device 200 according to Embodiment 2 has approximately the same configuration as the vehicular input device 100 according to Embodiment 1, and is different from the vehicular input device 100 according to Embodiment 1 in that further including plural contact sensors 17 and 18. Therefore, in the vehicular input device 200 according to Embodiment 2, the same constituent elements as those of the vehicular input device 100 according to Embodiment 1 are denoted by the same reference numerals.

The following describes a configuration different from that of Embodiment 1, and a description of the same configuration as that of Embodiment 1 will be omitted.

The contact sensors 17 and 18 (the hatched parts in FIG. 5) are sensors for detecting a contact with an object (for example, a driver's hand), and is either a capacitance touch sensor or a resistive touch sensor.

The contact sensor 17 provided for the steering wheel 10 is preferably positioned at a handgrip part 10a which is gripped by the driver's hand for operating the steering wheel 10. That is, the contact sensor 17 only needs to be positioned at the handgrip part 10a which is touched mainly by the driver. Moreover, the contact sensor 18 provided for the gearshift lever 11 is preferably positioned at a knob part 11a which is gripped with a hand by the driver for operating the gearshift lever 11. That is, the contact sensor 18 only needs to be positioned at the upper part of the gearshift lever 11 which is touched mainly by the driver.

Figure 6:
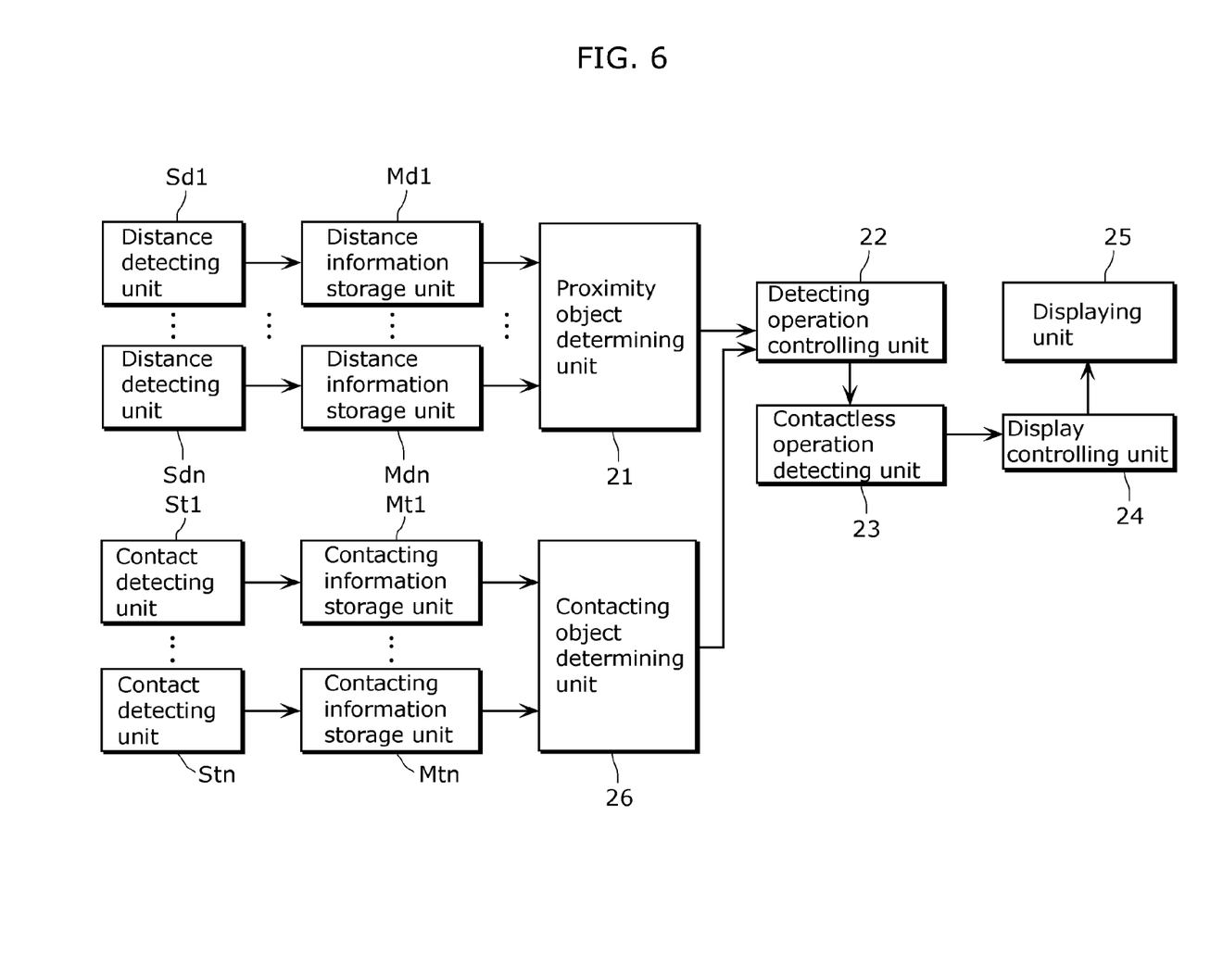
FIG. 6 is a block diagram showing a functional configuration of the vehicular input device according to Embodiment 2 of the present invention.

FIG. 6 is a block diagram showing a functional configuration of the vehicular input device 200 according to Embodiment 2 of the present invention.

As shown in FIG. 6, the vehicular input device 200 functionally includes the distance detecting units Sd1, Sd2, to Sdn, the distance information storage units Md1, Md2, to Mdn, the proximity object determining unit 21, plural contact detecting units St1, St2, to Stn, plural contacting information storage units Mt1, Mt2, to Mtn, a contacting object determining unit 26, the detecting operation controlling unit 22, the contactless operation detecting unit 23, the display controlling unit 24, and the displaying unit 25.

Here, only the contact detecting units St1, St2, to Stn, the contacting information storage units Mt1, Mt2, to Mtn, and the contacting object determining unit 26 which are not included in the vehicular input device 100 according to Embodiment 1 are described. Since the rest of the configuration is the same as that of the vehicular input device 100 according to Embodiment 1, descriptions are omitted.

The contact detecting units St1, St2, to Stn (n=2 in this embodiment) are implemented as the contact sensors 17 and 18 in FIG. 5. The contact detecting units St1, St2, to Stn are disposed on the steering wheel 10 and the gearshift lever 11 which are operation devices for driving a vehicle.

The contacting information storage units Mt1, Mt2, to Mtn (n=2 in this embodiment) are provided corresponding the contact detecting units St1, St2, to Stn, respectively, and contacting information obtained from each of the contact detecting units St1, St2, to Stn is stored therein for each of the contact detecting units for a predetermined period of time. That is, the contacting information storage unit Mti (i is an arbitrary number) is provided corresponding to the contact detecting unit Sti, and contacting information obtained from the contact detecting unit Sti is stored therein. It is to be noted that the contacting information is information for indicating the intensity of the contact between the object and the contact sensor 17 or 18 which constitutes the contact detecting units St1, St2, to Stn, and is, for example, information for indicating how strong the intensity of the contact between the driver's hand and each operation device is. Furthermore, the contacting information is a capacitance value in the case where the contact detecting unit is the capacitance touch sensor, and a pressure value in the case where the contact detecting unit is a resistive touch sensor.

The contacting object determining unit 26 determines whether or not the object is in contact with any of predetermined plural specific positions in the vehicle based on the contacting information stored in the contacting information storage units Mt1, Mt2, to Mtn.

Figure 7:
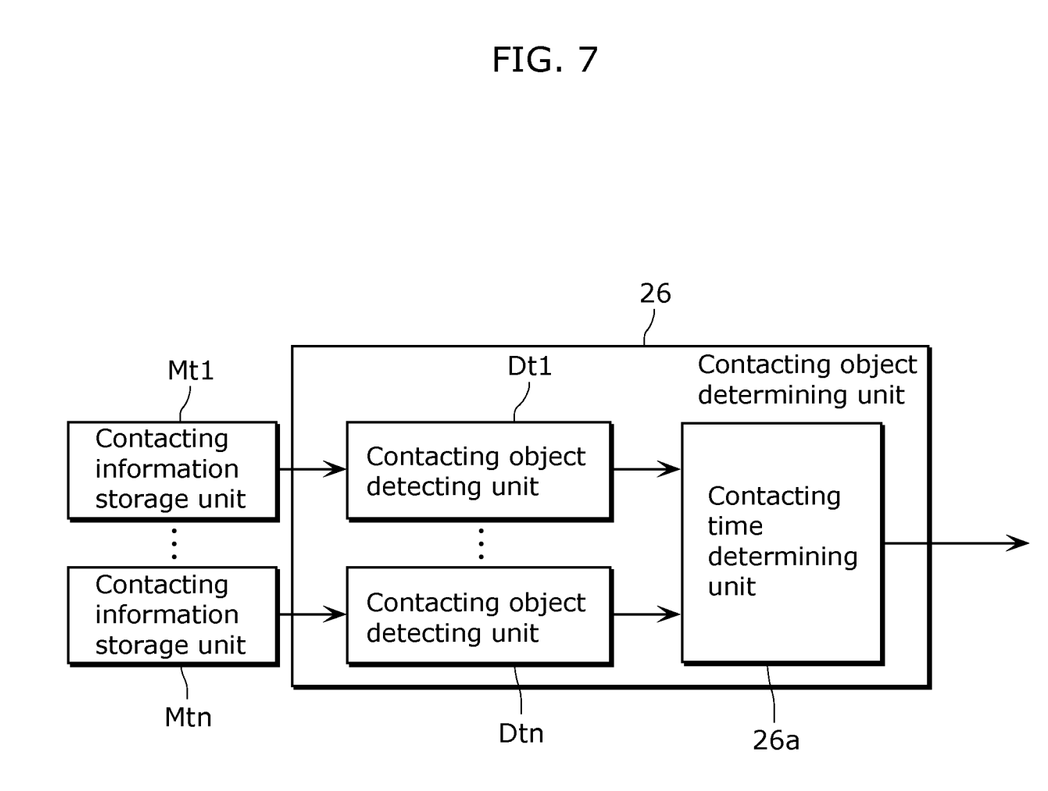
FIG. 7 is a block diagram showing a configuration of a contacting object determining unit according to Embodiment 2 of the present invention.

The contacting object determining unit 26 also includes plural contacting object detecting units Dt1, Dt2, to Dtn and contacting time determining unit 26a as shown in FIG. 7. FIG. 7 is a block diagram showing the configuration of the contacting object determining unit 26 according to Embodiment 2 of the present invention. The contacting object detecting units Dt1, Dt2, to Dtn are provided corresponding to the contacting information storage units Mt1, Mt2, to Mtn, respectively, compare the contacting information obtained from the contacting information storage units Mt1, Mt2, to Mtn and a preset threshold value, and output contact detection information when the contacting information has a value more than or equal to the threshold value. That is, in this case, the contact detection information is outputted when the intensity value indicating the intensity of the contact against the contact sensor is more than or equal to the threshold value.

The contacting time determining unit 26a determines that the object is in contact with any of the specific positions when the contact detection information is outputted from any of the contacting object detecting units Dt1, Dt2, to Dtn for the preset period of time. Accordingly, the contacting object determining unit 26 determines whether or not the object (such as the driver's hand) is in contact with the steering wheel 10 or the gearshift lever 11 based on plural contacting information items stored in the contacting information storage units Mt1, Mt2, to Mtn.

It is to be noted that the detecting operation controlling unit 22 limits the detection by the contactless operation detecting unit 23 when the proximity object determining unit determines that the object is in the proximity of any of the operation devices or the contacting object determining unit determines that the object is in contact with any of the operation devices.

Next, the following describes a procedure of operation input processing performed by the above described vehicular input device 200 according to Embodiment 2 configured as above.

Figure 8:
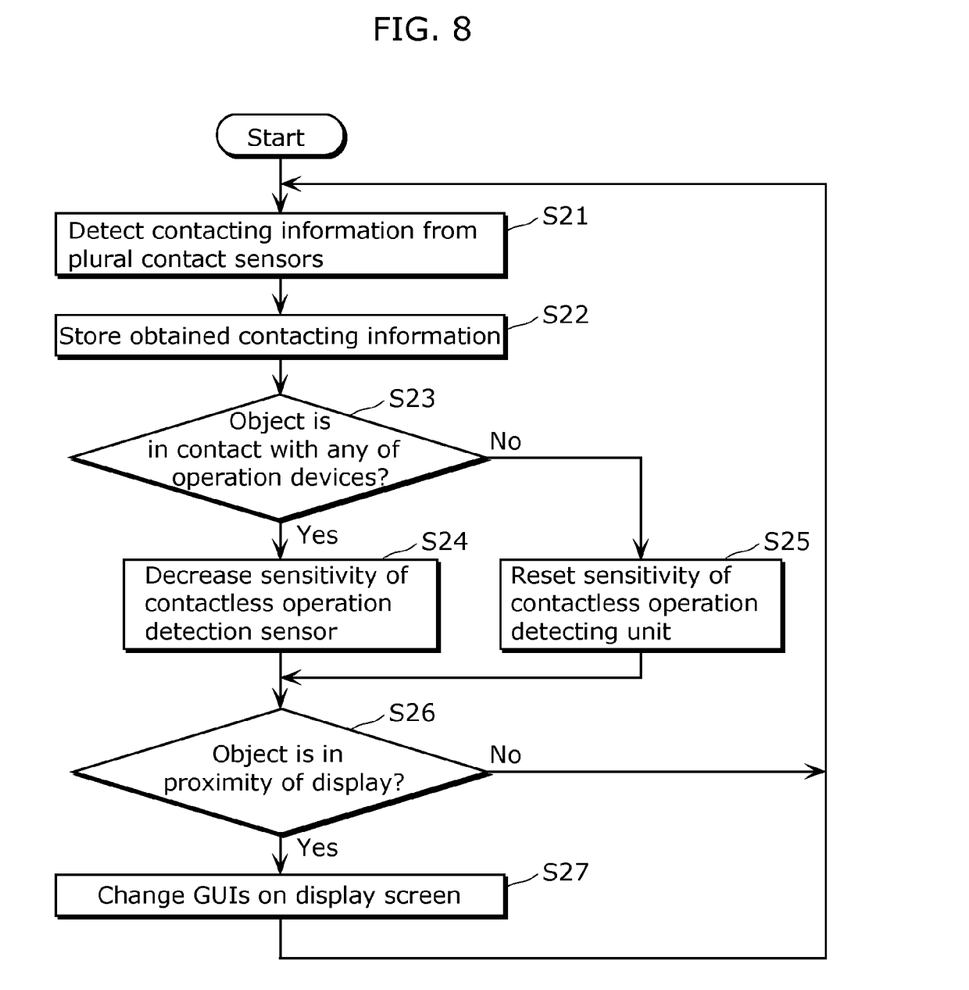
FIG. 8 is a flowchart showing a part of a procedure of operation input processing performed by the vehicular input device according to Embodiment 2 of the present invention.

FIG. 8 is a flowchart showing a part of the procedure of the operation input processing performed by the vehicular input device 200 according to Embodiment 2 of the present invention.

In the procedure of the operation input processing performed by the vehicular input device 200 according to Embodiment 2, the procedure of the operation input processing shown in FIG. 8 and a procedure of the operation input processing by the vehicular input device 100 according to Embodiment 1 are performed in parallel. Therefore, here, only the procedure of operation input processing different from that in Embodiment 1 will be described.

First, the contact detecting units St1, St2, to Stn detect that the object is in contact with the operation device and output the result as contacting information (S21).

Next, in each of the contacting information storage units Mt1, Mt2, to Mtn corresponding to the respective contact detecting units St1, St2, to Stn, contacting information provided from a corresponding contact detecting unit is stored (S22).

Subsequently, the contacting object determining unit 26 determines whether or not the object is in contact with the steering wheel 10 or the gearshift lever 11 based on plural contacting information items stored in the contacting information storage units Mt1, Mt2, to Mtn (S23).

When the contacting object determining unit 26 determines that the object is in contact with the steering wheel 10 or the gearshift lever 11, the detecting operation controlling unit 22 limits the detection by the contactless operation detecting unit 23 (S24), and the process proceeds to the next Step S26.

On the other hand, when the contacting object determining unit 26 determines that the object is not in contact with the steering wheel 10 or the gearshift lever 11, the sensitivity of the contactless operation detecting unit 23 is reset to the initial state (S25), and the process proceeds to the next Step S26.

Subsequently, the contactless operation detecting unit 23 determines whether or not the object is in the proximity of the center display 13 (S26).

When the contactless operation detecting unit 23 determines that the object is in the proximity of the center display 13, the GUI in the screen shown on the center display 13 is changed based on the input that is inputted through the movement of the object (S27).

When the contactless operation detecting unit 23 determines that the object is not in the proximity of the center display 13, the process returns to the Step S21.

Accordingly, when the contacting object determining unit 26 determines that the object is in contact with any of the operation devices in Step S23, it is determined that the driver is performing the driving operation. That is, the vehicular input device 200 determines that the driver is not performing a contactless input to the center display 13. In Step S24, the detecting operation controlling unit 22 decreases, based on the determination, the sensitivity of the contactless operation detecting unit 23 which is for detecting a contactless input to the center display 13. With this, it is possible to prevent the contactless operation detecting unit 23 from erroneously detecting a driving operation of the driver (for example, a movement to operate the steering wheel 10). On the other hand, when it is determined that the object is not in contact with any of the operation devices in Step S23, it is determined that the driver is not performing the driving operation. In this case, when the object is in the proximity of the center display 13, the contactless operation detecting unit 23 is capable of accurately receiving an input from the object (the driver's hand) because the sensitivity is not limited. Thus, it is possible to reduce the frequency that the operation GUI such as the menu is shown on the display screen due to the false detection of the movement of the driver not intended to perform a contactless input, thereby reducing stress and discomfort given to the driver.

It is to be noted that since the vehicular input device 200 according to Embodiment 2 performs in parallel the operation input processing described with reference to FIG. 4 in Embodiment 1, whether or not the object is in the proximity of the operation devices is simultaneously determined, too. With this, it is possible to more precisely determine whether or not the driver is performing the driving operation, thereby reducing false detections in which the movement of the driver in driving is erroneously detected by the contactless operation detecting unit 23.

Although the vehicular input device according to the present invention has been described based on the embodiments, the present invention is not limited to the above embodiments.

It is to be understood that the disclosed embodiments are illustrative and not restrictive in all respects. The scope of the present invention is indicated not by the above description but by the claims, and is intended to include equivalents of the claims and all modifications within the scope of the claims.

For example, although the specific positions for detection by the distance sensors 15 and 16 or the contact sensors 17 and 18 are the positions of two operation devices which are the steering wheel 10 and the gearshift lever 11 in the above embodiments, operation devices which are defined as the specific positions are not limited to these. For example, the operation device may be a windshield wiper switch or a direction indicator switch. It is to be noted that a distance sensor corresponding to the windshield wiper switch or the direction indicator switch is preferably positioned around the axis of the steering wheel which is near the connected part of the windshield wiper switch or the direction indicator switch.

Moreover, although a floor shift type gearshift lever is employed as the gearshift lever 11 in the above embodiment, it is not limited to this. An instrument panel type or a column shift type may be used. The distance sensor is positioned around the gearshift lever 11 in the cases of these types, too.

Although the sensitivity of the contactless operation detecting unit 23 is decreased to limit the detection by the contactless operation detecting unit 23 in the above embodiments, the way of limitation is not limited to this. The detection range of the contactless operation detecting unit 23 may be narrowed, or the sampling time of the contactless operation detecting unit may be shortened.

Although plural contact sensors are provided in the above embodiments, the number of contact sensors is not limited to plural. A contact sensor may be provided for only one operation device that is frequently used by the driver.

In the above embodiments, although the sensitivity of the contactless operation detecting unit 23 is uniformly decreased when the proximity object determining unit 21 determines that the object is in the proximity of the operation device based on the distance information detected by the distance detecting units Sd1, Sd2, to Sdn, it is not limited to this. For example, the proximity object detecting unit may determine the distance as multi-level threshold values according to the degree of the distance information, so that the detecting operation controlling unit 22 can decrease the sensitivity of the contactless operation detecting unit 23 in multiple levels according the degree of the threshold values. For example, a description is given of the case where the distance between the operation device and the object is set, as threshold values, to three levels of 15 cm, 10 cm, and 5 cm. The sensitivity of the contactless operation detecting unit 23 may be decreased as follows: decreased to 80% when the distance between the operation device and the object is no less than 10 cm and less than 15 cm; decreased to 60% in the case of no less than 5 cm and less than 10 cm; and decreased to 40% in the case of less than 5 cm.

Moreover, multi-level preset time may be set in the proximity time determining unit 21*a*, so that the detecting operation controlling unit 22 can decrease the sensitivity of the contactless operation detecting unit 23 in multiple levels according to the degree of the preset time. For example, a description is given of the case where 5 seconds, 10 seconds, and 15 seconds are set as the preset time. The sensitivity of the contactless operation detecting unit 23 may be decreased as follows: decreased to 80% when the proximity time determining unit 21*a* determines that the object is in the proximity state for no less than 5 seconds and less than 10 seconds; decreased to 60% in the case of for no less than 10 seconds and less than 15 seconds; and decreased to 40% in the case of no less than 15 seconds. It is to be noted that such a setting of the preset time in multiple levels is not limited to be applied to the proximity time determining unit 21*a*, but may be applied to the contacting time determining unit 26*a*.

In the above embodiments, in the procedure of the operation input processing performed by the vehicular input device, when it is determined that the object is not in the proximity of or is not in contact with the steering wheel 10 or the gearshift lever 11 (that is, the operation devices) (No in S13 or S23), the sensitivity of the contactless operation detecting unit 23 is reset to the initial state (S15 or S25). However, the resetting is not necessarily needed.

Although the contacting object detecting units Dt1, Dt2, to Dtn compare the contacting information obtained from the contacting information storage units Mt1, Mt2, to Mtn and the preset threshold value and output the contact detection information when the contacting information has a value more than or equal to the threshold value in the above embodiment, the comparison between the contacting information and the threshold value is not necessarily needed. For example, the contacting object detecting units Dt1, Dt2, to Dtn may output the contact detection information when having the contacting information obtained from the contacting information storage units Mt1, Mt2, to Mtn.

Although the vehicular input device according to an aspect or aspects of the present invention has been described based on the embodiments, the present invention is not limited to the above embodiments. Without materially departing from the scope of the present invention, modifications to the embodiments that are conceived by the person skilled in the art and other embodiments obtainable by arbitrarily combining the constituent elements in the embodiments may be included within the scope of an aspect or aspects of the present invention.

INDUSTRIAL APPLICABILITY

The present invention can be used as a vehicular input device, a vehicular input method, and others which are capable of decreasing, in a contactless input operation performed on the operation GUI on an in-vehicle display, false detections caused by an operation such as a driving operation that is an operation other than a contactless input operation.

REFERENCE SIGNS LIST

10 Steering wheel
10a Handgrip part
11 Gearshift lever
11a Knob part
12 Meter
13 Center display
14 Contactless operation detection sensor
15 and 16 Distance sensors
17 and 18 Contact sensors
21 Proximity object determining unit
21a Proximity time determining unit
22 Detecting operation controlling unit
23 Contactless operation detecting unit
24 Display controlling unit
25 Displaying unit
26 Contacting object determining unit
26a Contacting time determining unit
100, 200 Vehicular input device
Dd1, Dd2, to Ddn Proximity object detecting units
Dt1, Dt2, to Dtn Contacting object detecting units
Md1, Md2, to Mdn Distance information storage units
Mt2, to Mtn Contacting information storage units
Sd1, Sd2, to Sdn Distance detecting units
St2, St2, to Stn Contact detecting units

The invention claimed is:

1. A control apparatus in a vehicular input device including (i) a display for use in a vehicle, the display being adapted to a contactless operation, (ii) a contactless operation detecting sensor which detects the contactless operation on the display performed by an object that is at least a part of a body of the driver of the vehicle, and (iii) a distance sensor which detects a distance to the object, the control apparatus comprising:
an input unit configured to input information on the distance detected by the distance sensor, as a detection result; and
a control unit configured to limit the detection by the contactless operation detecting sensor based on the detection result, when (i) a distance between the object and a predetermined device related to a driving operation performed on the vehicle is shorter than or equal to a predetermined threshold based on the detection result and (ii) a period of time in which the distance between the object and the predetermined device is shorter than or equal to the predetermined threshold is longer than or equal to a preset period of time, and
wherein the limiting of the detection is to limit at least any one of sensitivity, a detection range, and a sampling time of the contactless operation detecting sensor.

2. The control apparatus according to claim 1, wherein the predetermined device is for operating at least one of a steering wheel, a gearshift lever, a windshield wiper switch, and a direction indicator switch.

3. The control apparatus according to claim 1, wherein the control unit includes a proximity object determining unit and a detecting operation controlling unit, the proximity object determining unit is configured to determine whether or not the distance between the object and the predetermined device is shorter than or equal to the predetermined threshold, and the detecting operation controlling unit is configured to limit the detection when the distance is shorter than or equal to the predetermined threshold.

4. The control apparatus according to claim 1, wherein the contactless operation detecting sensor detects, as the contactless operation, a hand of the driver for operation in the proximity of the display, or a hand gesture of the driver such as waving the hand, swinging the hand, and pointing toward the display.

5. The control apparatus according to claim 1, further comprising:
a contact sensor which is disposed on the predetermined device and detects that the object is in contact with the predetermined device;
a storage unit in which contacting information obtained from the contact sensor is stored for a predetermined period of time; and
a determining unit configured to determine whether or not the object is in contact with the predetermined device based on the contacting information stored in the storage unit, and
wherein the control unit is configured to limit the detection when the distance between the object and the device is shorter than or equal to the predetermined threshold, or when the object is in contact with the predetermined device.

* * * * *